United States Patent [19]
Musick

[11] 3,791,922
[45] Feb. 12, 1974

[54] THERMAL MARGIN PROTECTION SYSTEM FOR A NUCLEAR REACTOR

[75] Inventor: Charles R. Musick, Rockville, Conn.

[73] Assignee: Combustion Engineering, Inc., Windsor, Conn.

[22] Filed: Nov. 23, 1970

[21] Appl. No.: 91,808

[52] U.S. Cl.......................... 176/20, 176/19, 176/24
[51] Int. Cl. .............................................. B21c 7/32
[58] Field of Search............. 176/19, 19 EC, 19 T, 24

[56] References Cited
UNITED STATES PATENTS

| | | | |
|---|---|---|---|
| 3,341,422 | 9/1967 | Gilbert.............................. | 176/20 R |
| 3,356,577 | 12/1967 | Fishman............................. | 176/24 |
| 3,423,285 | 1/1969 | Curry et al.......................... | 176/24 |

FOREIGN PATENTS OR APPLICATIONS

| | | | |
|---|---|---|---|
| 952,022 | 3/1964 | Great Britain.................. | 176/19 EC |
| 827,436 | 2/1960 | Great Britain .................... | 176/19 T |

*Primary Examiner*—Reuben Epstein
*Attorney, Agent, or Firm*—Fishman & Van Kirk

[57] ABSTRACT

A thermal margin protection system for a nuclear reactor wherein the coolant low flow trip point and the calculated thermal margin trip point are switched simultaneously and the thermal limit locus is made more restrictive as the allowable flow rate is decreased. The invention is characterized by calculation of the thermal limit locus in response to applied signals which accurately represent reactor cold leg temperature and core power; cold leg temperature being corrected for stratification before being utilized and reactor power signals commensurate with power as a function of measured neutron flux and thermal energy added to the coolant being auctioneered to select the more conservative measure of power. The invention further comprises the compensation of the selected core power signal for the effects of core radial peaking factor under maximum coolant flow conditions.

26 Claims, 6 Drawing Figures

THERMAL MARGIN PROTECTION SYSTEM FOR A NUCLEAR REACTOR

BACKGROUND OF THE INVENTION

1. Field of the Invention

The present invention relates to safety systems for nuclear reactors. More specifically, this invention is directed to the prediction of internal reactor conditions commensurate with maintaining the integrity of the fuel element cladding. Accordingly, the general objects of the present invention are to provide novel and improved apparatus and methods of such character.

2. Description of the Prior Art

The performance of a nuclear reactor, like that of many other energy conversion devices, is limited by the temperatures which the component materials will tolerate without failure. In the case of a reactor, the upper limit of temperature is imposed by the fuel rod cladding material employed.

As is well known, in a reactor heat is generated by the fission process in the fuel material. The fission process, however, produces not only heat but radioactive isotopes which are potentially harmful and must be prevented from escaping to the environment. To this end, the fuel is clad with a material which retains the fission products. In order to obtain a useful output from the nuclear plant, and also to prevent clad overheating in the interest of precluding release of the fission products, a coolant must be circulated through the reactor core. Heat-transferred to the circulating coolant from the fuel elements is extracted therefrom in the form of usable energy downstream of the reactor core in a steam generator. Thus, for example, in a pressurized water reactor system the water flowing through the core is kept under pressure and is pumped to the tube side of a steam generator where its heat is transferred to water on the shell side of the generator. The water on the shell side is under lower pressure and thus the thermal energy transfer causes the secondary water to boil and the steam so generated is employed to drive a turbine.

To summarize, in the design and operation of a nuclear reactor, the basic objective of removing heat from the fuel must be obtained without allowing the temperature of the fuel cladding to become so high as to cause the clad to fail.

As the coolant circulates through the reactor core, heat will be transferred thereto either through subcooled convection, often referred to as film conduction, or through nucleate boiling. Nucleate boiling occurs at higher levels of heat flux and thus is the preferred mode of operation since it permits more energy to be transferred to the coolant and the reactor to thus be operated at a higher level of efficiency. Nucleate boiling is characterized by the formation of steam bubbles at nucleation sites on the heat transfer surfaces. These bubbles then break away from the surface and are carried into the main coolant stream. If the bulk coolant enthalpy is below saturation the steam bubbles collapse and there is no net vapor formation in the channel (subcooled boiling or local boiling). If the bulk fluid enthalpy is at or above the enthalpy of saturated liquid, the steam bubbles do not collapse and the coolant is said to be in bulk boiling.

If the heat flux is increased to a sufficiently high value, the bubbles formed on the heat transfer surface during nucleate boiling are formed at such a high rate that they cannot be carried away as rapidly as they are formed. The bubbles then tend to coalesce on the heat transfer surface and form a vapor blanket or film. This film has a high resistance to heat transfer, and the film temperature rise can become very large even though there is no further increase in heat flux. This transition from nucleate boiling to film boiling is called "departure from nucleate boiling," hereinafter referred to as DNB, and the value of the heat flux at which it occurs is called the "DNB heat flux" in a pressurized water reactor or the "critical heat flux" in a boiling water reactor. Similarly, if the quantity of steam per coolant volume becomes too great, a condition known as "excessive void fraction" may occur. Excessive void fraction may result in flow instabilities or a decrease in the heat transfer coefficient from the cladding to the coolant.

Since clad damage is likely to occur because of a decrease in heat transfer coefficient and the accompanying higher clad temperatures which may result when DNB or excessive void fraction occurs, the onset of these conditions must be sensed or predicted and corrective action, in the form of a reduction in fission rate, promptly instituted. Restated, in reactor operation DNB or excessive void fraction must be prevented since the concurrent reduction in clad strength as temperature increases can lead to a clad failure because of the external coolant pressure or because of the internal fission gas pressures in the fuel rod.

It is known that DNB will occur as a function of the reactor operating parameters of heat flux, primary coolant mass flow rate, primary coolant pressure and primary coolant temperature. It is also known that an excessive coolant void fraction condition can occur which may lead to premature DNB. In order to prevent an excessive coolant void fraction or DNB, also called "burnout" or "boiling crisis", reactor protective systems must be designed so that operation is curtailed, a condition known in the art as "reactor trip" or "reactor scram", before the combination of conditions commensurate with DNB or excessive coolant void fraction is calculated to exist. Departure from nucleate boiling or DNB ratio may be expressed as:

$$\text{DNBR} = f[(Q, T_C, P), (W), (F_N^{\Delta H} (\text{Axial Power Distribution})] \tag{1}$$

where:
$Q$ = core power in percent of full power
$T_C$ = coolant inlet temperature
$P$ = primary or reactor coolant system pressure
$W$ = coolant mass flow rate
$F_N^{\Delta H}$ = radial peaking factor Solutions to the problem of protective system design assume that primary coolant mass flow rate ($W$), $F_N^{\Delta H}$ and axial distribution of power in the reactor core are maintained at the limits of their normal operating envelopes; i.e., at their design values. The locus of points at which a DNB or excessive coolant void fraction thermal limit, hereinafter core thermal limit occurs for a given number of operating primary coolant pumps is then calculated as a function of primary coolant pressure, primary coolant cold leg temperature, and core power. Thereafter, instrumentation has been set up in the field to calculate these core thermal limit boundaries for each pump operating configuration as a function of primary coolant pressure, primary coolant hot leg temperature and primary coolant cold leg temperature. Redundant channels have been used to calculate these thermal limit boundaries and a reactor trip has been initiated whenever 1/2, 2/3, or 2/4 of the channels indicated that the core thermal limit has been exceeded. A principal disadvantage with the prior art method of implementing the on-line calculation of core thermal limit boundaries is that the methods and equipment employed have had inherent calibration difficulties which resulted from the fact that the relationship between reactor power and measured values of $T_C$ and $T_H$ must be accommodated in setting the gains of each channel of the redundant system separately.

Another major deficiency of prior art systems is that they could not readily accommodate part loop operation. Restated, the prior art techniques and protective systems have been incapable of providing maximum operational performance, while satisfying safety requirements, when less than the maximum number of coolant circulator pumps were operating.

A further deficiency of the prior art has resided in the failure to take into account the time delay effects of nuclear peaking factor. As is well known, the amount of power which can be obtained from the reactor varies inversely with the reactor operating parameter known as nuclear peaking factor. In calculating core power it has previously been the practice to assume that the radial peaking factor $F_N^{\Delta H}$ is not time dependent thereby reducing system safety and permitting a reactor trip during power reductions.

Another disadvantage in prior art protection systems is that the effects of stratification of the coolant was taken into account only in the custom calibration of each redundant channel at the plant site and, as noted above, the necessity of calibrating each channel separately is a decided disadvantage.

As is well known, within the cold leg conduit there is a calculable temperature profile which is repeatable; the variations in temperature resulting from the different lengths of tubes in the steam generator. This temperature profile or stratification, which is known to be dependent on power, should preferably be taken into account in attempting to predict the temperature of the coolant entering the hot channel of the reactor core.

SUMMARY OF THE INVENTION

The present invention overcomes the above-discussed and other deficiencies of the prior art by providing a novel and improved method of and apparatus for predicting whether the core DNB and/or void fraction limits, i.e., the core thermal limit of a reactor are in danger of being violated. In so doing, the invention employs a plurality of redundant channels. In each channel a plurality of signals, commensurate with measurements of reactor operating parameters, are delivered to an external logic network. The logic networks may be employed to cause a reactor trip to occur whenever the signals calculated in a preselected number of the redundant channels indicate that the core thermal limits are being violated.

In accordance with the present invention, "reactor trip" is programmed primarily as a function of core primary coolant pressure. Accurate core primary coolant pressure, reactor inlet or "cold leg" temperature and core power signals are obtained or calculated and are employed in a calculation of the core thermal limit locus. A plot of the core thermal limits represents a locus of points at which 1.3 DNBR or void fraction limits occur for various conditions of coolant pressure, coolant temperature and core power; the corresponding families of curves defining surfaces and being plotted by the reactor designer so as to take peaking factor into account. These loci are calculated in each channel of the protectve system and the present invention employs a flow selector switch which selects the correct locus for each channel for the particular primary coolant pump configuration employed. The flow selector switch also simultaneously selects the proper low flow trip and over power trip set points thereby obviating the possibility of an unsafe switch setting.

Thus, in accordance with the present invention, for each channel an accurate primary coolant cold leg temperature signal, corrected for stratification, and an accurate measure of core power are supplied as the inputs to a function generator which calculates a variable thermal margin set point signal. This thermal margin set or primary coolant pressure trip point signal is the minimum reactor coolant pressure which may be tolerated in the interest of safely avoiding the void fraction and DNB thermal limits for the existing conditions of rimary coolant cold leg temperature and core power. By comparison of the function generator output signal with a signal commensurate with the measured coolant pressure, a trip control signal may be produced.

Also in accordance with the invention, an accurate measure of core power is insured by auctioneering a first core power signal, as calculated as a function of measured neutron flux, with a second core power signal, as calculated as a function of coolant temperature and temperature rise between the upstream and downstream sides of the reactor core. The auctioneering of two meaures of core power, of course, is an added safety feature inherent to the present invention.

A particularly novel feature of the present invention resides in the fact that the calculated thermal margin set point, which has previously been known to be a non-linear function of cold leg temperature and core power, is made substantially linear by multiplying the selected power signal by a signal commensurate with core peaking factor before generating the set point signal. Thus the curves to be fitted by the protective system of the present invention are substantially linear thereby permitting the use of highly reliable analog circuitry in the trip point calculators of the redundant circuits. In addition, the safety of the core may be enhanced by incorporating a lag in the generation of the power dependent core peaking factor signal such that a conservatively high peaking factor is used in calculating the pressure trip point whenever measured power is rising.

Another feature of the present invention is the utilization of accurate core power and cold leg temperature input signals to the function generators. As noted above, the core power signal is generated by auctioneering two separate measurements of power and thereafter compensating the selected measure of power for peaking factor. The cold leg temperature signal is corrected for stratification. Since the input signals to the function generators for each channel are corrected prior to utilization, the function generators for each channel of the invention are permitted to have the same coefficients or constraints. This, in turn, permits these coefficients to be set up prior to plant operation and facilitates simple switchability for various coolant pump flow configurations.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1A:
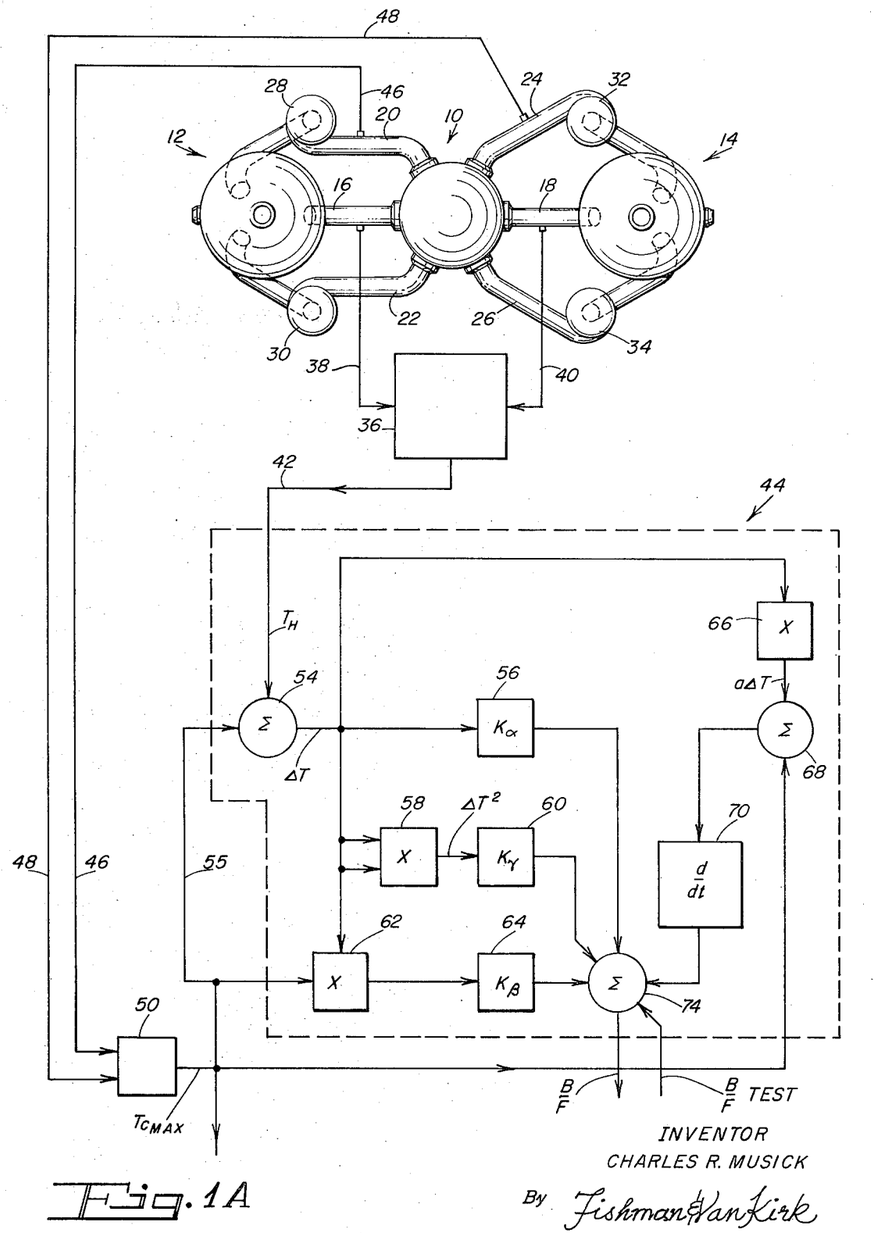
FIGS. 1A and 1B comprise a functional block diagram of one channel of a preferred embodiment of the present invention.
Figure 1B:
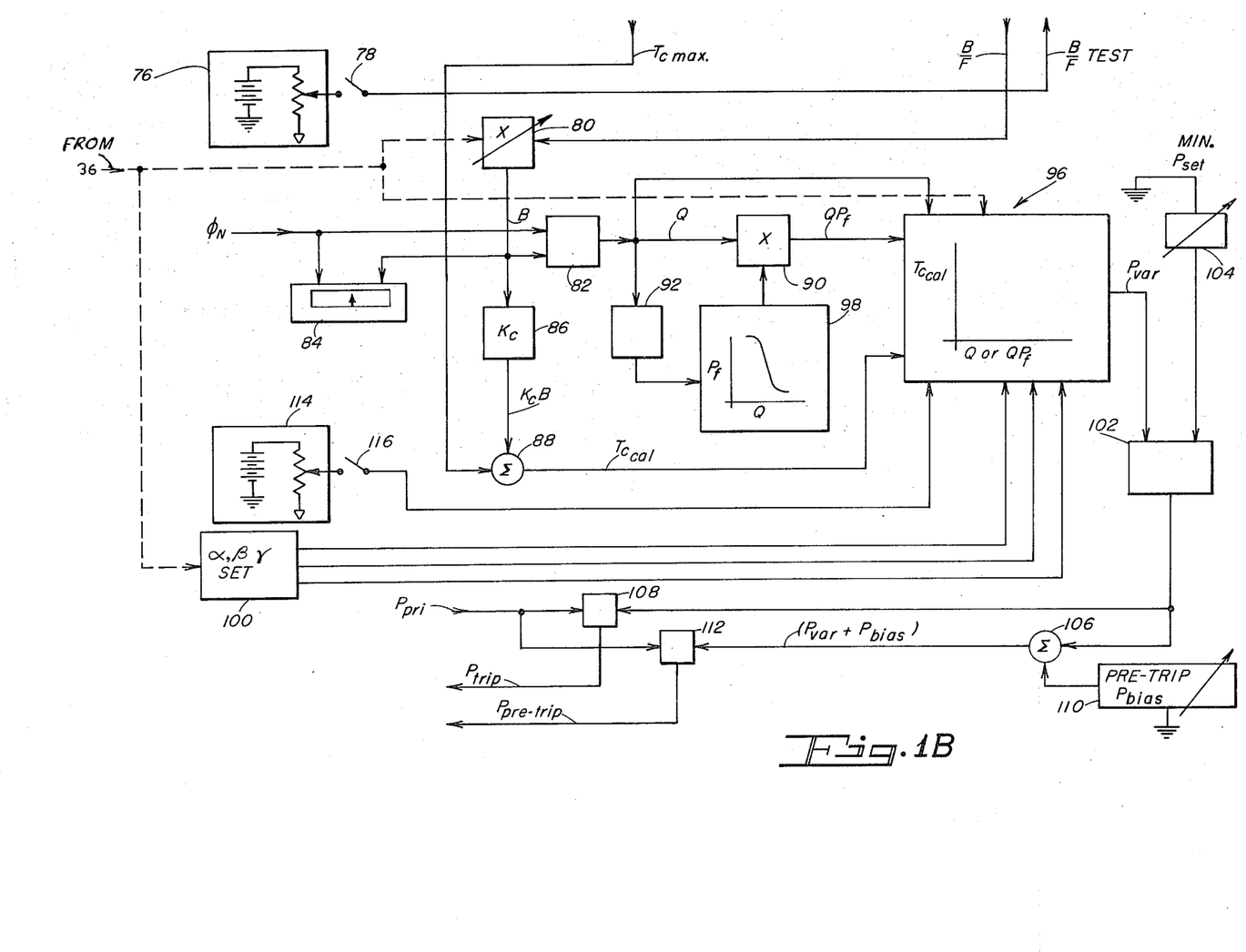

With reference to the drawing, FIGS. 1A and 1B comprise a functional block diagram of a preferred embodiment of the present invention as employed with a pressurized water reactor. The reactor is indicated schematically at 10 and a pair of steam generators associated therewith are indicated at 12 and 14. After being heated by energy transfer from the fuel elements in the reactor, the pressurized coolant will be delivered to steam generators 12 and 14 respectively by "hot leg" conduits 16 and 18. After giving up thermal energy in the steam generators, the coolant is returned to the reactor vessel via "cold legs" 20, 22, 24 and 26. Each of the cold legs has, associated therewith, a circulator or pump; the pumps for cold legs 20, 22, 24 and 26 being respectively indicated at 28, 30, 32 and 34.

Under normal conditions, all four circulator pumps will be operating. There may, however, be circumstances where less than all of the pumps will be utilized. Thus, for example, it may be necessary or desired to employ only the pumps associated with steam generator 12 as a result of an equipment malfunction or failure in the coolant loops associated with steam generator 14. A "pump selector" switch 36 is provided in order to permit the operator to coordinate the thermal margin protection system instrumentation with the actual pump operating configuration. As will be described below, there is no setting for switch 36 which is commensurate with unsafe protection limits regardless of the number of pumps in operation.

It is to be understood that FIGS. 1A and 1B depict one of four identical circuits or channels which will be employed with reactor 10 to predict the occurrence of DNB or excessive void fraction. For purpose of explanation, FIG. 1 may be considered to disclose the process instrumentation for channel A of the thermal margin protection system. Channel A; and also each of channels B, C and D; has associated therewith a plurality of sensors which provide signals commensurate with the following reactor operating parameters:

$T_{C1}$ - coolant input or cold leg 20 temperature
$T_{C2}$ - coolant input or cold leg 24 temperature
$T_{H1}$ - coolant output or hot leg 16 temperature
$T_{H2}$ - coolant output or hot leg 18 temperature
$P_{Pri}$ - primary coolant pressure (measured at the pressurizer)
$\phi_N$ - reactor power computed as a function of measured neutron flux The sensors for providing the signals commensurate with the above-listed parameters have been omitted from FIG. 1 in the interest of clarity. The sensors are, however, all state-of-the-art devices which are customarily included as part of the instrumentation in a reactor system. Thus, for example, the hot and cold leg temperature sensors may comprise commercially available platinum resistance temperature detectors and associated signal transmitting circuitry. The means for calculating core power as a function of neutron flux is also a state-of-the-art subsystem which employs out-of-core flux detectors and associated circuitry. A typical neutron responsive core power signal generator comprises a split uncompensated ion chamber with associated signal processing circuitry.

Figure 2:
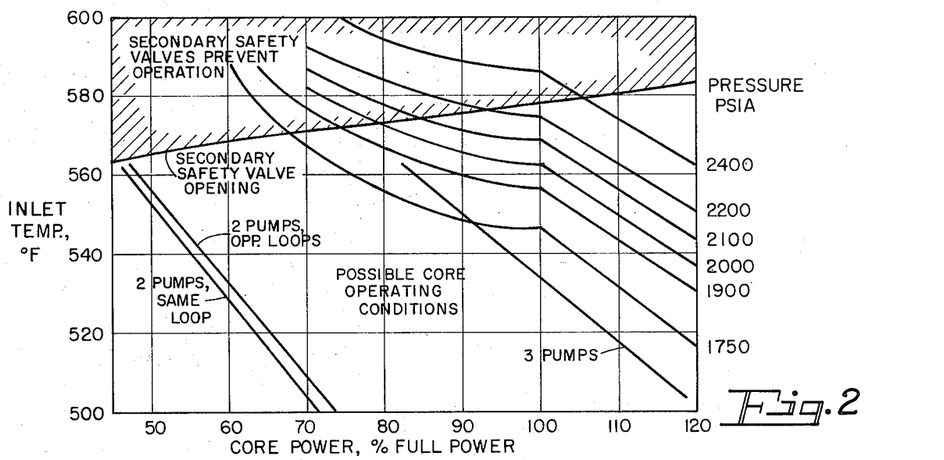
FIG. 2 is a plot of points at which DNB or void fraction limit occur for a typical reactor core.
Figure 3:
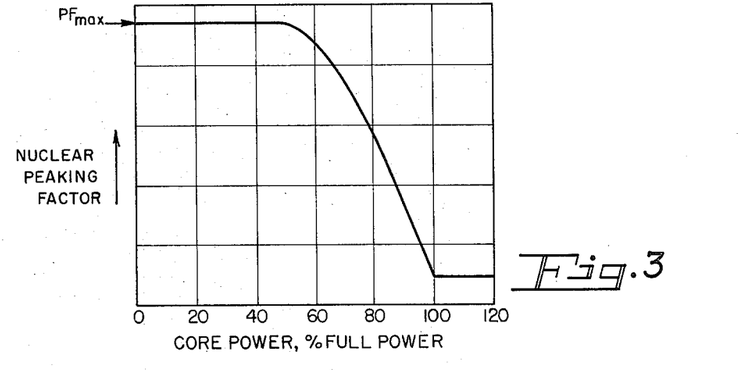
FIG. 3 is a plot of nuclear peaking factor versus percent of core power for a typical reactor.
Figure 4:
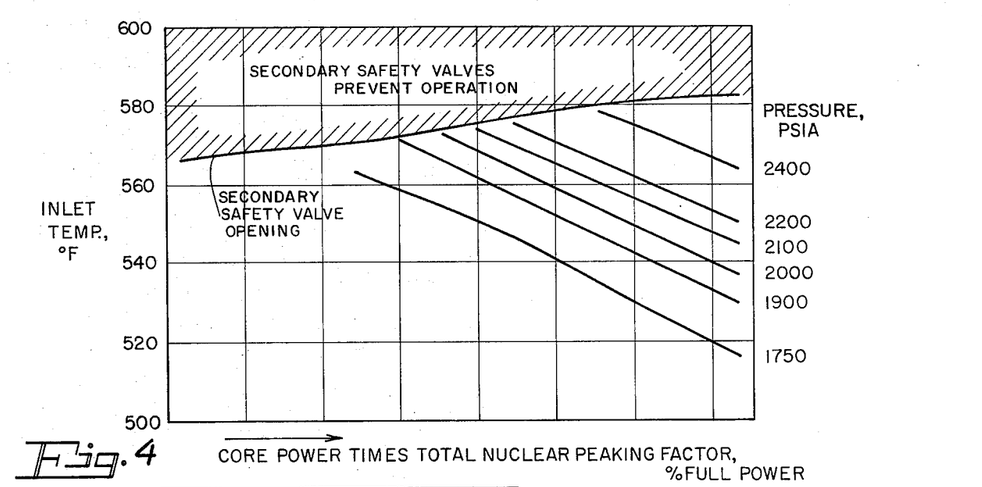
FIG. 4 is a plot of the accurate DNB and void fraction limits which are calculated by the present invention.

Before proceeding further with a description of the channel A circuitry of FIG. 1, it is believed that understanding of the present invention will be facilitated by first considering the graphical presentations of FIGS. 2-4. FIG. 2 represents a locus of points at which the 1.3 DNBR or void fraction limit occurs for various conditions of reactor inlet temperature, core power and primary coolant pressure. This locus of points will be calculated by the reactor designer assuming that coolant mass flow rate and spacial distribution of power in the core are equal to their design values. Upon fueling and operation of the reactor the accuracy of the design data will, of course, be verified and the families of curves depicted on FIG. 2 shifted as necessary. The areas above the pressure limit curves of FIG. 2 are commensurate with violation of the DNB ratio or void fraction limits; the curves being plotted on the basis of the hot "channel" in the reactor core and with a substantial margin of safety. To further explain FIG. 2, based on the assumptions noted above and also on the maintaining of radial and axial peaking factors within design values, DNB may be expressed as follows:

$$DNB = f(Q, T_C, P_{Pri}) \quad (2)$$

It is to be noted that the loci commensurate with reduced flow conditions; i.e., two or three pump operation in a four pump system; are planar. In the interest of facilitating understanding of FIG. 2, only single curves rather than a family of curves have been shown for these reduced flow conditions. Under maximum flow conditions, the plotted locus is nonlinear and in both full and reduced flow situations operating surfaces are defined. It is further to be noted that, in plotting the loci of FIG. 2, by assuming that the power dependent parameter of radial peaking factor is at its design value the reactor designer takes nuclear peaking factor into account.

As pointed out above, the pressure curves of FIG. 2 are non-linear for maximum flow conditions. However, it can be shown that the thermal limit locus for the hot channel in the reactor core is virtually planar when defined as a function of the power input to that hot channel. The radial peaking factor is defined as the ratio of the total power generated in the hottest pin or fuel element to that generated in the average element. A typical plot of radial peaking factor versus percent of core power is represented in FIG. 3. The plot of FIG. 3 is supplied by the reactor designer as a result of detailed computer calculations in a manner known in the art.

As shown in FIG. 4, and as will be seen from a comparison of FIGS. 2 and 3, by compensating the reactor power input signal for peaking factor, the temperature versus power curves of FIG. 2 will be rendered substantially linear. Thus, in accordance with a particularly novel feature of the present invention, a thermal margin protection system is provided wherein reactor trip is programmed as a function of coolant pressure in a system wherein the selected core power measurement is adjusted for nuclear peaking factor.

Understanding of the present invention may be facilitated by reference to Volume 2 of "Final Safety Analysis Report-Fort Calhoun Station Number One," AEC Docket No. 50-285, Exhibit F-17 on file at the AEC Public Documents Room. This report, which is incorporated herein by reference, in sections 3.4 and 3.5 further explains the manner of obtaining the data employed in plotting the graphs of FIGS. 2–4.

Returning now to a consideration of FIG. 1, the signals generated by the temperature sensors associated with "hot legs" 16 and 18 are respectively delivered via conductors 38 and 40 to an averaging device associated with pump selector switch 36. It is necessary that the averaging circuit, which has been omitted from FIG. 1 in the interest of clarity, be ganged with the pump selector switch so that an output signal may be generated which is either the average of the "hot leg" temperatures or the temperature of the "hot leg" of the active loop in the situation where only the pumps in a single coolant loop are being operated. The average or selected "hot leg" temperature signal is employed as an input signal to a core power calculator indicated generally at 44.

A pair of channel A "cold leg" temperature signals, as generated by temperature sensitive devices positioned in "cold legs" 20 and 24, are delivered via conductors 46 and 48 to an auctioneering circuit 50. Circuit 50 may, for example, comprise a Bell and Howell Model 19–502 amplitude selector. Circuit 50 selects the highest of the two "cold leg" temperature signals applied at its input terminals and thus the output of circuit 50 is the $T_{C\ max}$ "cold leg" temperature signal. This maximum "cold leg" or upstream coolant temperature signal is applied as a second input to the core power calculator 44. After compensation for stratification, in the manner to be described below, the $T_{C\ max}$ signal is also employed as an input to the coolant pressure trip point calculator.

A brief description will now be given of the calculator 44 which provides an output signal commensurate with core power as a function of the increase in temperature of the coolant between the upstream or "cold leg" side of the reactor core and the reactor output or "cold leg." For a further and more detailed description of a core power calculator which is responsive to $T_C$ and $T_H$ input signals, reference may be had to copending application Ser. No. 55,331 of Charles R. Musick and Richard P. Remshaw for "Instrumentation for Nuclear Reactor" filed July 16, 1970, and assigned to the same assignee as the present invention. The average or active loop "hot leg" signal $T_H$ is delivered, from the averaging circuit associated with pump selector switch 36, to a first summing circuit 54 in calculator 44 via conductor 42. The $T_{C\ max}$ signal from auctioneering circuit 50 is, as noted above, also applied to summing circuit 54 via conductor 55. The output of summing circuit 54 is, accordingly, a $\Delta T$ signal commensurate with the thermal energy added to the primary loop coolant as it passes through the reactor core. This $\Delta T$ signal, as generated by summing circuit 54, is an indication of core power which, after suitable compensation, provides an accurate measure of core power under steady state conditions; the core power calculations based upon $\Delta T$ being comparatively insensitive to transient conditions.

As pointed out in the above-referenced copending application, in order to utilize coolant temperature differential as a measure of core power, it is necessary to account for a number of variables which affect the rate at which thermal energy will be transferred to the coolant. The required compensation is accomplished in the course of synthesizing a steady state $\Delta T$ power measure signal and a signal which provides dynamic compensation for the steady state signal. In generating the steady state signal, the $\Delta T$ signal from summing circuit 54 is applied to a first compensation network 56 wherein it is multiplied by constant $K\alpha$. Compensation circuit 56 may comprise merely a potentiometer. The signal resulting from the multiplication, $K\alpha \Delta T$, represents the primary component of the composite steady state $\Delta T$ power or $B$ signal.

The $\Delta T$ signal from summing circuit 54 is also applied to both inputs of a multiplier circuit 58 in order to generate a $\Delta T^2$ signal. This $\Delta T^2$ signal is thereafter applied to a compensation circuit 60 wherein it is multiplied by a constant $K\gamma$. Compensation circuit 60 may be identical to compensation circuit 56.

The sum of the outputs of compensation circuits 56 and 60 may be expressed as: $K\alpha \Delta T + K\gamma \Delta T^2$ (3)

This quantity is representative of the relationship between $\Delta T$ and power for a $T_C$ of 490°F.

The $\Delta T$ signal is also applied to a further multiplier circuit 62. The selected $T_C$ signal is also applied to multiplier 62. The output of multiplier 62 varies as the product of $\Delta T$ and $T_C$ max.

It will, of course, be obvious to those skilled in the art that constants may be added to or subtracted from the various measured temperature parameters so that the circuitry may operate on signals which are referenced to some temperature in or near the normal operating range of the reactor. Thus, for example, prior to application to the multiplier 62, the $T_{C\ max}$ signal may be compared with a selected design condition temperature such as, for example, 490°F.

The signal generated by multiplier 62 is applied to a compensation circuit 64 wherein it is multiplied by a constant $K\beta$. Compensation circuit 64 may be identical to compensation circuits 56 and 60 and the constant $K\beta$ is commensurate with variations in $\Delta T$ as coolant temperature is changed while holding power constant.

As previously noted, the measure of core power as calculated from measured coolant thermal parameters may be made more accurate for slow and intermediate speed power transients by dynamically compensating the steady state signal for the rate of heat addition to the stored thermal energy content of the primary coolant. This may be accomplished by differentiating any primary coolant thermal parameter or combination thereof, multiplying by the appropriate gain factor and adding the product to the steady state $\Delta T$ expression of power. In the disclosed embodiment of the invention, the $\Delta T$ signal from summing circuit 54 is applied to a multiplier 66 wherein it is multiplied by a gain factor $a$. The gain factor $a$ is selected during field tests to match $B$ to $Q$; $Q$ being determined from test data. The output of multiplier 66 and the $T_{c\ max}$ signal from selector circuit 50 are applied to a summing circuit 68 to generate the following signal:

$$T_X = A\Delta T + T_C = aT_H + (1 - a) T_C \tag{4}$$

The $T_X$ signal is applied to a differentiating network 70.

The $\Delta T$ signals from compensation circuits 56, 60 and 64 and the dynamic compensation signal from differentiation network 70 are added in a summing circuit 74. The output of summing circuit 74 is thus a measure of power as a function of the thermal energy added to the primary loop coolant and this signal may be expressed as follows:

$$B/F = K\alpha\Delta T + K\beta\Delta T (T_{c\ max.} - 490) + K\gamma\Delta T^2 + \tau d/dt (T_{c\ max.} + a\ \Delta T) \tag{5}$$

where
$B$ = percent of maximum core power, and
$F$ = a dimensionless constant having a value dependent on the number of coolant circulator pumps in operation.

Summing circuit 74 may comprise an operational amplifier with input and feedback resistors such as, for example, Bell and Howell adder-subtractor Model 19-30-1-A.

It is to be noted that an additional input to summing circuit 74 is connected to an adjustable voltage source 76 (FIG. 1B) via a normally open switch 78. Through the closing of switch 78 and appropriate adjustment of source 76, the operation of the present invention may be periodically tested by applying a power signal in excess of that which is actually present.

Continuing with a description of FIG. 1B, the $B/F$ signal from summing circuit 74 is applied to an adjustable multiplier 80. Under normal conditions; i.e., maximum flow with all coolant circulator pumps operating; the applied power signal will be passed by multiplier 80 without compensation. That is, with maximum flow the constant $F$ will be unity. Multiplier 80, which comprises a plurality of potentiometers and an associated selector switch, is ganged to pump selector switch 36. Under reduced flow conditions multiplier 80 will be set so as to the th appropriate constant $F$ whereby the $B/F$ power signal will be adjusted in proportion to the total primary coolant mass flow rate. Accordingly, when part loop operation is required or desired, the constant $F$ will be decreased so as to effectively attenuate the gain constants in equation 5 to thereby adjust the power signal to accommodate the fact that $\Delta T$ rises as flow rate is reduced with core power being held constant.

The power $B$ signal passed by multiplier 80 and the $\phi_N$ power signal produced by the flux measuring devices are auctioneered in auctioneering circuit 82. Circuit 82, which may be identical to circuit 50, selects the highest of the applied power signals and passes this $Q$ signal on to the thermal margin set point calculator 96. The two separate measures of power are also applied to a null meter relay 84. Meter 84 comprises a commercially available device which displays the difference between $B$ and $\phi_N$. Meter 84 also establishes high and low alarm set points. Violation of these set points will cause generation of an alarm signal indicative of a need to recalibrate the $\phi_N$ channel.

The $B$ power signal passed by multiplier 80 is also applied to a compensation circuit 86. Compensation circuit 86 may comprise a multiplier wherein the B power signal is multiplied by the constant $K_C$. The stratification error in reactor primary coolant measurements is known to be linear with power. Accordingly, the output of multiplier 86, the stratification compensation factor $K_CB$, will also vary linearly with power. The constant $K_C$ is established through a standard procedure wherein the actual value of $T_{C_{cal}}$ is determined utilizing all available temperature measurements; $K_C$ thereafter being adjusted so that the sum of $T_C$ and $K_CB$, as computed in a summing circuit 88, is equal to the determined value of $T_{C_{cal}}$. Thus, the output of summing circuit 88 is the selected $T_C$ signal as compensated for stratification. This cold leg temperature signal, $T_{C_{cal}}$, is also applied as an input to pressure trip point calculator 96.

The highest or selected power signal $Q$ from auctioneer circuit 82 is applied to a further multiplication circuit 90, a delay circuit 92 and a further input to set point calculator 96. Circuit 92 delays the application of the power signal to a peaking factor function generator 98 during periods when the power is being changed. The delay of application of the power signal to function generator 98 enhances reactor safety by causing application of a conservatively high power signal to calculator 96 during increases in power.

Function generator 98 generates an output signal commensurate with the peaking factor versus power curve of FIG. 3. The peaking factor function generator may, for example, comprise a pair of cascaded Bell and Howell Model 19-301-A adder-subtractor circuits; the use of two cascaded circuits with diode by-pass and feedback means being in the interest of establishing the upper and lower break points of the peaking factor curve.

The output of function generator 98 is applied to multiplier circuit 90 wherein the power signal from auctioneer circuit 82 will be compensated for peaking factor by being multiplied by the function generator 98 output signal. Multiplier 90 may, for example, comprise a Bell and Howell MOdel 19-309 multiplier circuit. Multiplier 90 will typically also perform a summation function wherein a peaking factor bias will be added to the compensated power signal to adjust for the minimum positive value of the peaking factor curve. The $QP_F$ output signal from circuit 90 will be applied to set point calculator 96. As noted above, when delay circuit 92 is incorporated in the system, the output of function generator 98 will lag increasing power and thus the $QP_F$ signal will be conservatively high.

The pressure trip or thermal margin set point which is calculated by circuit 96 may be expressed as follows for maximum flow conditions presuming a four-pump system:

$$P_{VAR} = \alpha_4 (QP_F) + \beta_4 (T_{C\ cal} - 490) + \gamma_4 \tag{6}$$

where
$\alpha_4$ = a constant commensurate with the relationship between $QP_F$ and $P_{Pri}$ for a fixed DNB ratio when cold leg temperature is held constant;

$\beta_4$ = a constant commensurate with the relationship between $P_{Pri}$ and cold leg temperature for a constant DNB ratio when $QP_F$ is held constant; an $\gamma_4$ = a constant commensurate with the desired pressure (thermal margin) trip set point for design values The $\alpha$, $\beta$ and $\gamma$ signals are provided by signal generator means, indicated schematically at 100, which is ganged to the pump selector switch 36. As will be described below, the signal generator means 100 comprises a plurality of potentiometers and associated switches and, in actual practice, the signal generator 100 is functionally a portion of calculator 96 and the power and temperature signals are applied thereto. The potentiometers are set so as to provide for range change from full to various part loop operations and the selected outputs from circuit 100 are applied as further inputs to calculator 96.

As will also be described in greater detail below, calculator 96 is provided with switches ganged to pump selector switch 36 whereby the proper thermal margin set point signal will be generated and delivered to the output terminal of circuit 96. Under full flow operation, the $QP_F$ signal from multiplier 90 will be combined with the $T_{C\,cal}$, $\alpha$, $\beta$ and $\gamma$ signals in accordance with equation 6 to generate the appropriate output signal. Under part loop operation, the switch means in calculator 96 will provide for the utilization of the $Q$ output of auctioneer circuit 82 in preference to the $QP_F$ signal for use in the generation of the $P_{VAR}$ signal. As previously noted, and as may be seen from FIG. 2, under part loop operation the pressure trip point curves are linear and it is thus unnecessary to compensate the selected power signal for peaking factor prior to application to calculator 96. In generating the signals represented by equation 6, calculator 96 may comprise merely an adder-subtractor such as, for example, Bell and Howell Model 19–301– A.

The $P_{VAR}$ output signal generated by calculator 96 is applied to a first input of an amplitude selector circuit 102. A minimum pressure trip point signal from an adjustable voltage source 104 is also applied to selector circuit 102. The trip point signal provided by a source 104 will be commensurate with the minimum permissible primary coolant pressure. Selector circuit 102, which may be a Bell and Howell Model 19–502 amplitude selector, will select the greater of the signals applied thereto.

The signal passed by selector circuit 102 will be applied to a summing circuit 106. A second signal, commensurate with a pre-trip bias as generated by an adjustable voltage source 110, will be applied as the second input to summing circuit 106. The pre-trip bias will typically be commensurate with 100 psi and will cause the generation, in the manner to be described below, of a pre-trip alarm signal indicative that the core thermal limits are being approached. The pre-trip alarm signal will, of course, lead the actual reactor trip signal as a result of the bias provided by adjustable source 110.

A signal commensurate with the actual measured value of primary coolant pressure $P_{Pri}$ is applied as an input to a first bistable comparator circuit 108 also as an input to a further bistable comparator circuit 112. Bistable circuit 112 compares the biased $P_{VAR}$ signal from summing circuit 106 with the actual pressure signal and, when the biased set point signal exceeds the actual pressure signal, an alarm output will be provided from circuit 112. Similarly, bistable circuit 108 compares the $P_{VAR}$ signal with the $P_{Pri}$ signal in order to generate a trip signal whenever the calculated signal exceeds the actual primary coolant pressure signal. The pre-trip and trip pressure signals respectively generated by bistable circuits 112 and 108 will be applied to suitable alarm and control rod "scram" circuits which do not comprise part of the present invention. Bistable circuits 108 and 112 may be operational amplifier circuits and associated conventional solenoid operated relay contacts.

It is to be noted that an additional test signal may be applied to calculator 96 from a voltage source 114 via a normally open switch 116. The test signal from source 114 may be employed to safely test the operation of the bistable trip and pre-trip circuits during normal plant operation. In performing the test operation, one channel at a time may be checked thereby avoiding an actual reactor trip.

Figure 5:
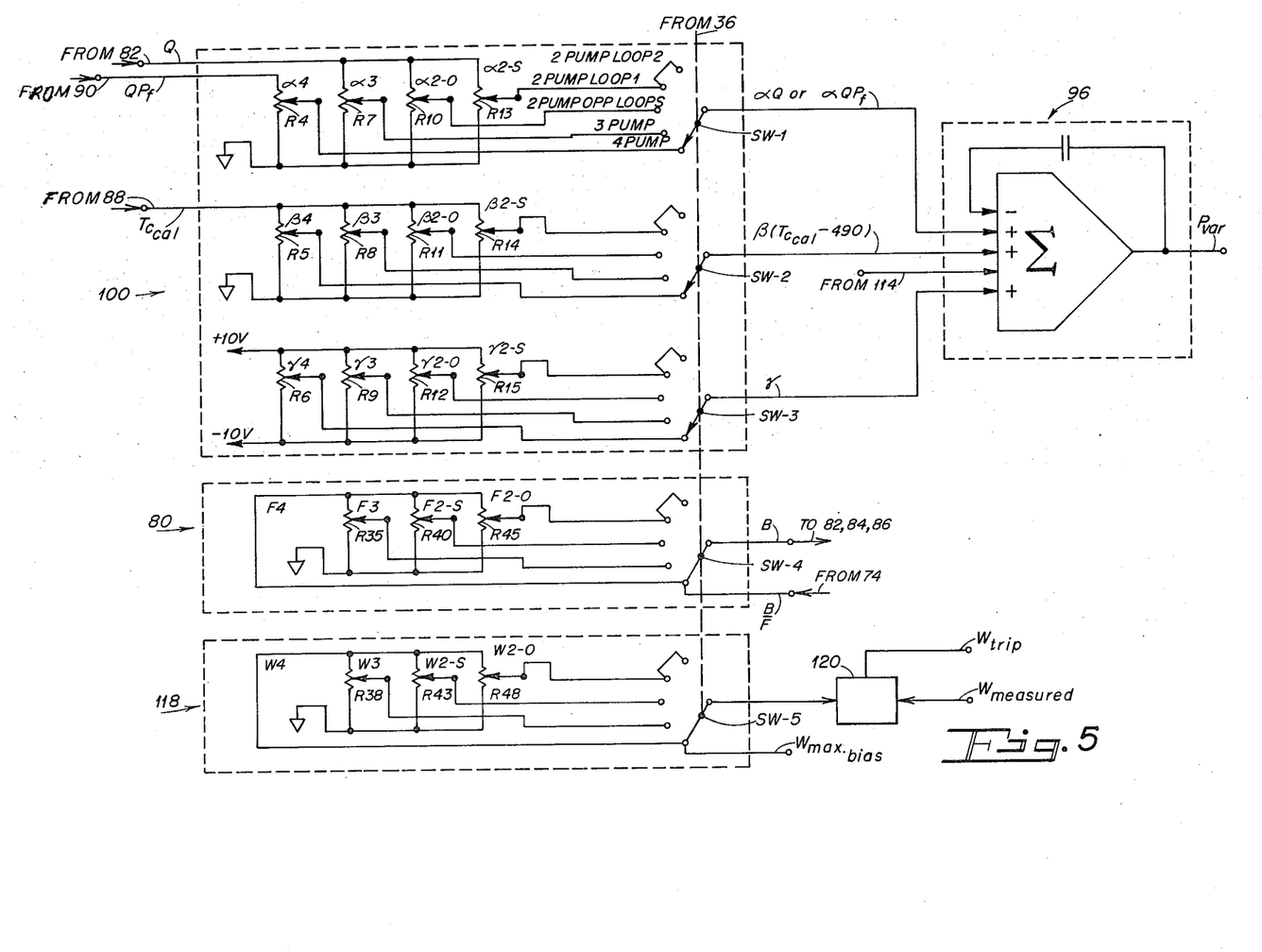
FIG. 5 is an electric schematic diagram of a portion of the circuitry represented by FIG. 1.

Referring now to FIG. 5, a portion of the circuitry which comprises the preferred embodiment of FIG. 1 is shown schematically. As noted above, the function generator 100 and calculator 96 will, in practice, typically be electrically combined. The power signals from auctioneering circuit 82 and multiplier circuit 90 as well as the calibrated temperature signal from summing circuit 88 will be applied as inputs to the circuit. As may be seen from FIG. 5, the function generators which provide the preset constants $\alpha$, $\beta$ and $\gamma$ each comprise four potentiometers so as to accommodate, in the four pump example being described, the five possible classes of pump operation. Thus, considering the generation of the power dependent term of $P_{VAR}$ equation 6, potentiometers R4, R7, R10 and R13 are employed. Potentiometers R7, R10 and R13 are connected in parallel and have the $Q$ signal from auctioneer circuit 82 applied thereacross; these three potentiometers being commensurate with the four possible part loop circulator pump classifications. The $QP_F$ signal from multiplier 90 is applied to potentiometer R4. Similarly, the $\beta(T_{C\,cal} - 490)$ term of equation 6 is generated by four parallel connected potentiometers R5, R8, R11 and R14 which have the $T_{C\,cal}$ signal from summing circuit 88 applied thereto. The $\gamma$ term of equation 6 is generated by parallel connected potentiometers R6, R9, R12 and R15. Selector switches SW-1, SW-2 and SW-3 are respectively connected to the wiper arms of the potentiometers of the three groups which generate the terms of equation 6 as discussed above. The three selector switches are ganged together and are also ganged to pump selector switch 36. The signals selected by switches SW-1, SW-2 and SW-3 are applied as inputs to the adder-subtractor circuit which comprises calculator 96 and are summed therein to provide the $P_{VAR}$ output signal.

FIG. 5 also depicts the variable multiplier circuit 80. Circuit 80 comprises three parallel connected potentiometers R35, R40 and R45. The $B/F$ signal from summing circuit 74 is applied across these three potentiometers. Multiplier 80 further comprises a selector switch SW-4 which is also ganged to pump selector switch 36. Switch SW-4 is shown in the maximum flow or four pump condition wherein the compensation factor $F$ is unity.

A particularly novel feature of the invention consists of the selection of a low flow trip set point simultaneously with the positioning of pump selector switch 36. The low flow set point selector switch SW-5 is ganged to pump selector switch 36 and is associated with a multiplier circuit 118 comprising parallel connected potentiometers R38, R43 and R48. A bias signal $W_{max\ bias}$ commensurate with the maximum or four pump flow rate is connected across potentiometers R38, R43 and R48 and the wiper arms of the potentiometers are connected to contacts of switch SW-5 as shown. The selected low flow trip set point signal from switch SW-5 is applied to a further bistable circuit 120 wherein it is compared with a signal $W_{actual}$ commensurate with the measured flow rate. The actual flow rate signal is provided by means well known in the art. Whenever the actual flow rate falls below the low flow trip set point, bistable circuit 120 will provide an output command signal which will result in a reactor "trip." Bistable circuit 120 may be identical to circuits 108 and 112.

It is to be noted that the invention will operate without the inclusion of delay circuit 92 and thus this circuit is to be considered as an additional safety option. It is also to be noted that a high power trip set point and the low flow and high power pre-trip set points will be established by groups of parallel connected potentiometers and associated switches, not shown, which are ganged to pump selector switch 36. These trip and pre-trip set point signal generators will be similar to multiplier 80 and will establish a power trip set point and power and low flow pre-trip alarm points commensurate with the circulator flow classification. While the establishment of these additional trip and pre-trip set points does not comprise part of the present invention, it is noteworthy that, by ganging the set point establishing means with the pump selector switch 36, it is a relatively easy task for the plant operator to maximize efficiency under all flow conditions. The established power trip set point will, of course, be compared with a selected measure of core power.

As noted above, there is no position of switch 36 which will permit unsafe operation. In accordance with the invention the thermal limit locus is calculated to be valid when primary coolant flow rate is at or above a design value for the number of pumps in operation. The $\Delta T$ power $F$ constant, low flow trip points and thermal margin trip points are effectively switched simultaneously and the thermal limit locus is made more restrictive as the allowable flow rate is decreased. Therefore, if the setting of switch 36 is "lower" than the actual number of pumps in operation, a reactor trip may not be needed and will not be generated unless the more restrictive thermal limit locus which is valid for the reduced flow rate is violated. However, if the setting of switch 36 is "higher" than the actual number of pumps in operation, the flow trip set point, as established by signal generator 118 (FIG. 5), will exceed the actual measured flow rate and a reactor trip will result. It is to be noted that auctioneering the flux power $\phi_N$ with the $\Delta T$ power $B$ insures that a conservative measure of core power will be utilized by the thermal margin set point calculator 96 for any incorrect setting of switch 36. As an added safety feature, the invention employs alarm means, not shown, which compares the setting of switch 36 with the number of circulator pumps receiving power. The plant operator will, accordingly, be provided with an audible or visual alarm indicative of an incorrect setting of switch 36.

It is to be noted that while the stratification error has been shown as being calculated using the $\Delta T$ power signal, any other measure of core power can be employed for this purpose. Also, a measure of the decay activity of a specific nuclide in the coolant, or other measure of core power, could be used in the invention rather than $\Delta T$ power.

While a preferred embodiment has been shown and described, various modifications and substitutions may be made therto without departing from the spirit and scope of the invention. Accordingly, it is to be understood that the present invention has been described by way of illustration and not limitation.

What is claimed is:

1. In a thermal damage protection apparatus for a nuclear reactor system, said system including a reactor core having channels therein through which a coolant is circulated and means for monitoring and generating signals commensurate with the coolant temperature and core power, the improvement comprising:
   means responsive to a signal commensurate with core power for generating a signal which varies in proportion to core radal peaking factor;
   means responsive to said core power and peaking factor signals for generating a power signal compensated for peaking factor; and
   means responsive to said compensated power signal and to a signal commensurate with the coolant temperature upstream of the reactor core for generating a signal commensurate with the core thermal limit as a function of coolant pressure.

2. The apparatus of claim 1 further comprising:
   means for correcting the upstream coolant temperature signal to compensate for stratification effects before applying said temperature signal to said thermal limit signal generating means.

3. The apparatus of claim 2 wherein said correcting means comprises:
   means responsive to signals commensurate with coolant temperature upstream and downstream of the reactor core for generating a signal commensurate with core power as a function of thermal energy added to the coolant;
   means for multiplying said signal commensurate with power as a function of added thermal energy by a stratification constant to generate a stratification error signal; and
   means for summing said stratification error and upstream coolant temperature signals to provide a coolant temperature signal corrected for stratification effects.

4. The apparatus of claim 1 further comprising:
   means responsive to signals commensurate with coolant temperature upstream and downstream of the reactor core for generating a signal commensurate with core power as a function of thermal energy added to the coolant; and
   means responsive to said signal commensurate with core power as a function of added thermal energy and to a signal commensurate with core power as a function of measured neutron flux for selecting the signal commensurate with the highest power level for application to said peaking factor signal generating means.

5. The apparatus of claim 4 further comprising:
means for correcting the upstream coolant temperature signal to compensate for stratification effects before applying said temperature signal to said thermal limit signal generating means.

6. The apparatus of claim 5 wherein said correcting means comprises:
means for multiplying said signal commensurate with power as a function of added thermal energy by a stratification constant to generate a stratification error signal; and
means for summing said stratification error and upstream coolant temperature signals to provide a coolant temperature signal corrected for stratification effects.

7. In a thermal damage protection apparatus for a nuclear reactor system, said system including a reactor core having channels therein through which a coolant is circulated and means for monitoring the coolant temperature and core power, as a function of measured neutron flux and for generating signals commensurate therewith, the improvement comprising:
means responsive to signals commensurate with coolant temperature upstream and downstream of the reactor core for generating a signal commensurate with core power as a function of thermal energy added to the coolant;
means responsive to said signal commensurate with core power as a function of added thermal energy and to a signal commensurate with core power as a function of measured neutron flux for selecting the signal commensurate with the highest power level; and
means responsive to the power signal passed by said selecting means and to said signal commensurate with upstream coolant temperature for generating a signal commensurate with the core thermal limit as a function of coolant pressure.

8. The apparatus of claim 7 further comprising:
means responsive to the selected power signal for generating a signal which varies in proportion to core radial peaking factor; and
means responsive to the selected power signal and to said peaking factor signal for generating a power signal compensated for peaking factor for application to said thermal limit signal generating means.

9. The apparatus of claim 7 further comprising:
means for correcting the upstream coolant temperature signal to compensate for stratification effects before applying said temperature signal to said thermal limit signal generating means.

10. The apparatus of claim 9 wherein said correcting means comprises:
means for multiplying said signal commensurate with power as a function of added thermal energy by a stratification constant to generate a stratification error signal; and
means for summing said stratification error and upstream coolant temperature signals to provide a coolant temperature signal corrected for stratification effects.

11. The apparatus of claim 10 further comprising:
means responsive to the selected power signal for generating a signal which varies in proportion to core radial peaking factor; and
means responsive to the selected power signal and to said peaking factor signal for generating a power signal compensated for peaking factor for application to said thermal limit signal generating means.

12. The apparatus of claim 7 wherein said reactor system includes a plurality of coolant circulator pumps and wherein said improved protection apparatus further comprises:
means for varying the signal commensurate with core power as a function of added thermal energy in accordance with the circulator pump operating configuration prior to application to said selecting means.

13. The apparatus of claim 12 wherein said thermal limit signal generating means comprises:
means for modifying said signal commensurate with upstream coolant temperature in accordance with a constant which changes with the circulator pump configuration;
means for modifying said selected power signal in accordance with a constant which changes with the circulator pump configuration;
means for combining said modified temperature and power signals to generate said thermal limit signal; and
switch means operatively connected to said added thermal energy power signal varying means for selecting temperature and power signals commensurate with the pump configuration for application to said signal combining means.

14. The apparatus of claim 13 further comprising:
means responsive to the power signal passed by said selecting means for generating a signal which varies in proportion to core radial peaking factor;
means responsive to said selected core power and peaking factor signals for generating a power signal compensated for peaking factor; and
means delivering said compensated power signal to said means for modifying the power signal in addition to said selected power signal whereby said switch means will select a modified peaking factor compensated power signal when in the position commensurate with operation of all available circulator pumps.

15. The apparatus of claim 14 further comprising:
means for correcting the upstream coolant temperature signal to compensate for stratification effects before applying said temperature signal to said thermal limit signal generating means.

16. The apparatus of claim 15 wherein said correcting means comprises:
means for multiplying said signal commensurate with power as a function of added thermal energy by a stratification constant to generate a stratification error signal; ane
means for summing said stratification error and upstream coolant temperature signals to provide a coolant temperature signal corrected for stratification effects.

17. The apparatus of claim 12 further comprising:
means for generating a plurality of coolant low flow set point signals; and means operatively connected to said added thermal energy power varying means for selecting a low flow set point signal commensurate with the circulator pump configuration.

18. The apparatus of claim 16 further comprising:
means for generating a plurality of coolant low flow set point signals; and
means operatively connected to said added thermal energy power varying means for selecting a low flow set point signal commensurate with the circulator pump configuration.

19. A thermal margin protection system for a nuclear power plant, said plant including a reactor core having channels therein for the circulation of a coolant and a plurality of coolant circulator pumps, said reactor also being provided with sensors for producing core inlet and outlet coolant temperature signals and a core power signal said protection system comprising:
means responsive to a signal commensurate with coolant inlet temperature for generating a plurality of temperature signals commensurate with the possible circulator pump configurations;
means responsive to a signal commensurate with core power for generating a plurality of power signals commensurate with the possible circulator pump configurations;
summing means for combining applied core power and coolant inlet temperature signals to generate a thermal limit signal commensurate with coolant pressure;
first switch means for selecting one of said coolant temperature signals and a corresponding core power signal for application to said summing means, said switch means being positioned in accordance with the pump operating configuration;
means for generating a plurality of low flow trip set point signals commensurate with the possible circulator pump configurations; and
second switch means operatively connected to said first switch means for selecting a low flow set point signal commensurate with the positioning of said first switch means.

20. The apparatus of claim 19 further comprising:
means responsive to signals commensurate with coolant inlet and outlet temperature for generating a signal commensurate with core power as a function of thermal energy added to the coolant; and
means operatively connected to said first switch means for varying said signal commensurate with core power as a function of added thermal energy in accordance with the pump operating configuration.

21. The apparatus of claim 20 wherein said reactor core also has means for generating a core power signal as a function of measured neutron flux associated therewith and wherein said protection system further comprises:
comparing means responsive to said signals commensurate with core power as a function of flux and coolant thermal energy increase for selecting the signal representative of the highest power level application to said means for generating a plurality of power signals.

22. The apparatus of claim 21 further comprising:
means responsive to the selected power signal for generating a signal which varies in proportion to core radial peaking factor; and means responsive to the selected power signal and to said peaking factor signal for generating a power signal compensated for peaking factor for application to said means for generating a plurality of power signals whereby said first switch will select a power signal compensated for peaking factor only when in the position commensurate with operation of all the circulator pumps.

23. The apparatus of claim 22 further comprising:
means for correcting the coolant inlet temperature signal to compensate for stratification effects before applying said temperature signal to said means for generating a plurality of temperature signals.

24. The apparatus of claim 23 wherein said correcting means comprises:
means for multiplying said signal commensurate with power as a function of added thermal energy by a stratification constant to generate a stratification error signal; and
means for summing said stratification error and coolant inlet temperature signals to provide a coolant temperature signal corrected for stratification effects.

25. Apparatus for generating a signal commensurate with total core power produced by a nuclear reactor, said reactor including a core and a coolant circuit through said core, said reactor further including plurality of independently operable coolant circulator pumps and means for selecting the pumps to be operated, said coolant circuit having a hot side at the outlet from the reactor core and a cold side at the inlet to the reactor core and including means for providing signals commensurate with measured coolant temperature at the hot and cold sides of the core, said power signal generating apparatus comprising:
means responsive to said hot and cold side temperature signals for generating a signal commensurate with core power as a function of thermal energy added to the circulating coolant;
a plurality of separately adjusted attenuator devices, each of said attenuator devices being preset in accordance with a coolant mass flow rate;
means applying said core power sgnal to said attenuator devices to generate a plurality of power signals respectively commensurate with said mass flow rates;
switch means for selecting one of said mass flow rate compensated power signals; and
means for coupling said switch means to the means for selecting the reactor circulator pump operating configuration whereby said switch means will be positioned in accordance with the number of coolant circulator pumps in operation and the selected power signal will be commensurate with the mass flow rate corresponding to the number of operating circulator pumps.

26. The apparatus of claim 25 wherein said power signal generating means comprises:
means responsive to the hot and cold side temperature signals for providing an output signal which varies as the sum of $K\alpha\Delta T + K\gamma\Delta T^2 + K\beta\Delta T (T_c) + d/dt (a \Delta T + T_c)$
where:
$K\alpha$, $K\beta$, $K\gamma$ and $a$ are gain constants
$\Delta T$ is the difference between the hot and cold side temperatures
$T_c$ is the cold side temperature.

* * * * *